Feb. 23, 1926.

J. A. BARR

LIQUID TRANSFER MEANS

Filed August 19, 1925

Inventor

Joseph A. Barr

By Frederick D Church his Attorney

Patented Feb. 23, 1926.

1,573,796

UNITED STATES PATENT OFFICE.

JOSEPH A. BARR, OF COLDWATER, NEW YORK.

LIQUID-TRANSFER MEANS.

Application filed August 19, 1925. Serial No. 51,271.

*To all whom it may concern:*

Be it known that I, JOSEPH A. BARR, a citizen of the United States, residing at Coldwater, in the county of Monroe and State of New York, have invented certain new and useful Improvements in Liquid-Transfer Means; and I do hereby declare the following to be a full, clear, and exact description of the same, reference being had to the accompanying drawings, forming a part of this specification, and to the reference numerals marked thereon.

The present invention relates to liquid transfer means and has for its object to provide improved means for emptying bodies of liquid from tanks or containers, or for transferring the liquid from one container to another and particularly where it is desired to empty fixed quantities of liquid at intervals from an automatically replenishing supply source.

The invention further contemplates an improved liquid transfer device of such a nature as to avoid the use of tanks or containers of the ordinary valve controlled type whereby to overcome the disadvantages often experienced with leaky valves and the cost of maintaining the valve mechanism in repair.

A further object of the invention is to provide an improved arrangement of adjustable siphons in which one is adapted to effect the adjustment of another and in which both remain charged when at inoperative position, the arrangement being one which is simple in construction, efficient in operation and economical to manufacture.

To these and other ends the invention resides in certain improvements and combinations of parts, all as will be hereinafter more fully described, the novel features being pointed out in the claims at the end of the specification.

In the drawings:—

Similar reference numerals throughout the several views indicate the same parts.

Figure 3:
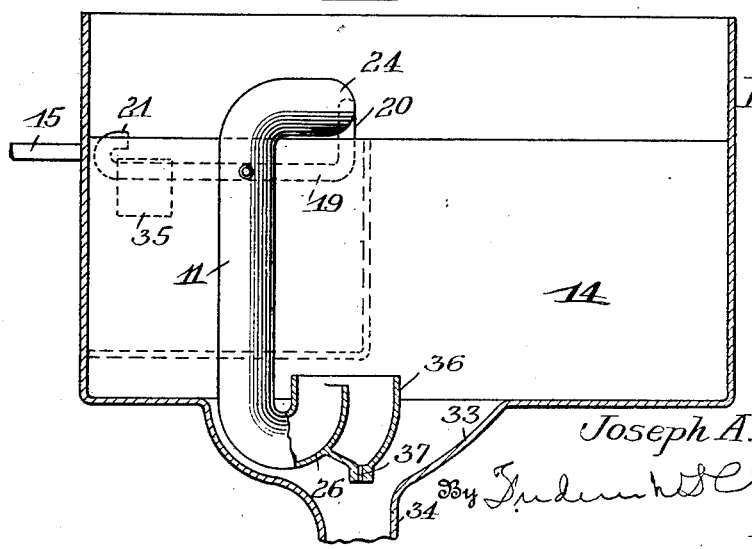
Figure 3 is a similar view with the larger siphon shown in position to transfer the liquid from one container to another.

The present invention is in the nature of an improvement over that disclosed in my prior Patent Number 1,133,606, granted March 30, 1915, and embodies, instead of a fixed siphon and a movable siphon, two connected adjustable siphons 10 and 11, the former being adapted to transfer from a receiving tank or container 12 to a supply tank 13, while the larger siphon 11 is adapted, in the position shown in Figure 3, to transfer from the supply tank to a discharge tank or chamber 14. The receiving tank 12 is fed from a supply pipe 15 which preferably connects with a large reservoir not shown having a constant level and serving to maintain a constant level in the receiving tank 12 within the capacity of the pipe 15. The siphon 10 preferably embodies the receiving and discharge legs 18 and 19, respectively, connected by an angularly disposed loop 20, the legs having their free ends bent as indicated at 21 to render the siphon self-sealing when in the horizontal position shown in Figure 3.

Figure 1:
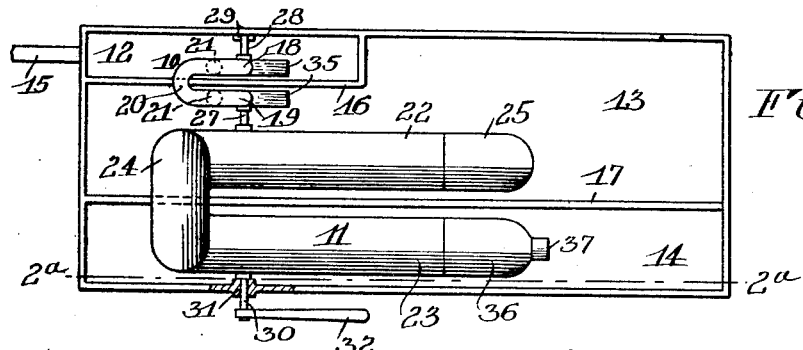
Figure 1 is a top plan view illustrating one embodiment of the invention.
Figure 2:
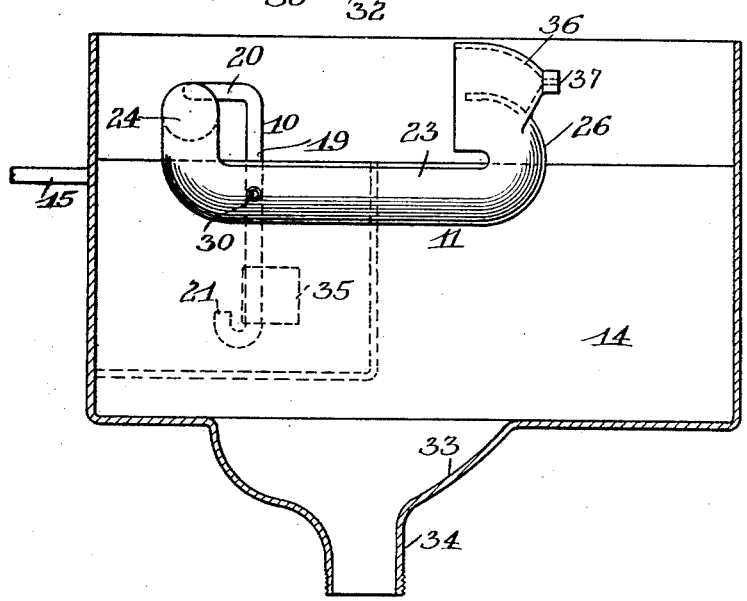
Figure 2 is a vertical section taken substantially on line 2ª—2ª of Figure 1, with the siphons shown in normal position.

Likewise the siphon 11 embodies a receiving leg 22 and a discharge leg 23 connected by an angularly disposed loop 24, the legs having their free ends terminating, respectively, in laterally and upwardly extending portions 25 and 26 to render the siphon self-sealing when in the horizontal position shown in Figure 2. The siphons are disposed at right angles to each other as indicated in Figure 3, and are rigidly connected by a suitable member 27 so that movement of one will effect movement of the other. The siphon 10 is provided with a trunnion 28 disposed preferably within an open bearing or groove 29 on the rear wall of the receiving tank 12. The outer leg of the siphon 11 is likewise provided with a trunnion 30 alined with the trunnion 28 and disposed in a suitable bearing 31 on the front wall of the chamber 14. The trunnion 30 is shown extended through said wall to receive an operating lever 32, movement of which affects simultaneous movement of both siphons from the normal position shown in Figure 2 to the emptying position shown in Figure 3. The trunnion 30 may be made to terminate in a bearing located entirely within the wall of the chamber 14, similar to the bearing 29, in order to avoid perforating the tank wall, in which case the operating lever will be constructed and applied to the siphon 11 in a manner similar to that shown in my prior patent mentioned above.

The chambers 13 and 14 each have their bottom walls provided with a depression as indicated at 33 for receiving the ends of the legs 22 and 23, the depression in the discharge chamber 14 terminating in a threaded extension 34 for receiving the flushing pipe of the water closet, not shown, or a suitable connection for conveying the liquid to any desired destination.

The siphon 11 is normally held in the position shown in Figure 2 by the weight of the siphon 10 and its contents, together with suitable counterbalancing weights 35 disposed on the legs 18 and 19 of the siphon 10 adjacent the upturned portions 21 of said legs.

In order to temporarily hold the siphon 11 in the operating position shown in Figure 3 long enough for it to empty the tank 13 a weeping cup 36 is disposed upon the discharge end 26 of the siphon leg 23 in position to receive from the latter the overflow therefrom which keeps the cup filled as long as the siphon continues to function, the liquid in the cup acting as a weight on the leg 23 to maintain the siphon 11 in said position. The weeping cup is provided with a small orifice 37 in its bottom through which the liquid is discharged following the emptying of the tank 13, after which the siphons are automatically returned to normal position since the siphon 10 and the weights thereon are sufficient to overcome the weight of the siphon 11 when the weeping cup is empty.

It will be understood that by reason of the peculiar construction of the siphons that they will both remain charged when in horizontal position as well as when in the opposite positions indicated, due to the open ends of the legs being above the main body of the siphon when each is in horizontal position.

In the operation of the device, assuming that the receiving tank 12 is substantially filled and the siphons 10 and 11 both charged, movement of the siphon 11 to vertical position will carry siphon 10 to horizontal position. Siphon 11, by reason of its movement to said position begins to function and continues until the liquid is withdrawn from tank 13 to the level of the upturned portion 25 of the leg 22. Siphon 11, following leakage of the liquid from the weeping cup will be automatically raised by reason of the counterbalancing weights of siphon 10. Upon return of the siphon 10 to normal upright position it will immediately begin to function and will continue to do so until the liquid in the tank 13 has been raised to the predetermined level determined by the position of the pipe 15. It will be seen therefore that the only manual operation required is that of moving the lever 32 to shift the siphons from the position shown in Figure 2 to that shown in Figure 3.

While the siphon 10 is shown considerably smaller than the siphon 11 it will be understood that its size and proportions may be varied as desired with the weight so distributed as to afford an effective counterbalance for the emptying siphon 11 when the latter ceases to function.

One advantage of the present invention is that both siphons are self-sealing and remain charged at all times regardless of their positions. Another advantage is that one is employed to return the other to normal inoperative position. The present arrangement also permits an imperforate tank or container to be employed, thus avoiding the use of valves, which as well known, require considerable attention from time to time, being expensive to keep in repair as well as wasteful of the water supply.

I claim as my invention:

1. The combination with receiving, supply and discharge receptacles and a liquid supply source connected with the receiving receptacle, of an adjustable siphon for transferring from the receiving to the supply receptacle, a second siphon for transferring from the supply to the discharge receptacle operatively connected with the first for moving the latter to a predetermined position, the second mentioned siphon being adapted upon delivering a predetermined charge to be returned to normal position by the first mentioned siphon when moving from said predetermined position.

2. The combination with receiving, supply and discharge receptacles and a liquid supply pipe delivering to the receiving receptacle, of an adjustable siphon for transferring from the receiving to the supply receptacle, a second siphon for transferring from the supply to the discharge receptacle, means for moving one of the siphons to a predetermined inoperative position and means operatively connecting the other siphon with the last mentioned siphon whereby it serves to automatically return the second mentioned siphon to normal inoperative positions when the latter ceases to function.

3. The combination with receiving, supply and discharge receptacles, of a pair of adjustable siphons movable to and from operating position and each constructed to remain constantly charged, one of which is adapted to transfer from the receiving to the supply receptacle and the other from the supply to the discharge receptacle, and means for effecting adjustment of said siphons.

4. The combination with receiving, supply and discharge receptacles and a liquid supply source connected with the receiving receptacle, of a pair of connected adjustable siphons movable alternately from inoperative to operative position within the receptacles and each constructed to remain constantly charged, and actuating means connected with one of said siphons.

5. The combination with receiving, supply and discharge receptacles, of a pair of connected adjustable transfer and discharge siphons movable alternately from inoperative to operative position and adapted to transfer liquid from the receiving to the discharge receptacle, said transfer siphon being adapted to return the discharge siphon to inoperative position when the latter ceases to function, means for moving the last mentioned siphon to operating position and means whereby a portion of the liquid transferred serves to temporarily prevent return of the one siphon by the other.

6. The combination with receiving, supply and discharge receptacles and a liquid supply source connected with the receiving receptacle, of a pair of connected siphons adjustably mounted within said receptacles, each of which is in operative position when the other is at inoperative position and one of which is arranged to be returned to inoperative position by the other after delivering a predetermined charge.

7. The combination with receiving, supply and discharge receptacles, of a pair of angularly disposed siphons, one of which has its receiving and discharge legs disposed respectively within the receiving and supply receptacles and the other having its receiving and discharge legs disposed respectively within the supply and discharge receptacle, means connecting and pivotally supporting said siphons, the second mentioned siphon being adapted to be automatically returned by the first to normal position at the end of its discharge period and operating means connected with one of the siphons.

8. The combination with receiving, supply and discharge receptacles, of a pair of angularly disposed siphons adapted for transferring liquid from the receiving to the supply receptacle and thence to the discharge receptacle when in certain predetermined positions, means adjustably supporting the siphons upon the receptacles for movement to said positions, the siphon for transferring from the receiving to the supply receptacle being designed to automatically return the other siphon to inoperative position when the latter ceases to function, and a weeping cup carried by the last mentioned siphon adapted to prevent its return to inoperative position while functioning.

9. In a device of the class described, a pair of connected angularly disposed transfer and discharge siphons adapted to be adjustably mounted within adjacently positioned receptacles, the transfer siphon being adapted to overbalance the other siphon whereby to return it to normal inoperative position when not functioning as a liquid discharge device and the latter being adapted to prevent such return while functioning.

10. In a device of the class described, a pair of connected angularly disposed transfer and discharge siphons adapted for use in transferring liquid between adjacently mounted receptacles and having means adapted to engage the receptacles to permit the siphons to swing therein, the transfer siphon being proportioned to swing the other siphon to normal inoperative position when it is not functioning as a liquid transfer device, the latter including a weeping cup serving to prevent its return to normal inoperative position while functioning.

JOSEPH A. BARR.